(12) United States Patent
Cyrus et al.

(10) Patent No.: US 11,047,781 B2
(45) Date of Patent: Jun. 29, 2021

(54) MOUNTING JIG ASSEMBLIES FOR SUPPORTING TEST COMPONENTS ON TESTING PLATFORMS OF TESTING ASSEMBLIES

(71) Applicant: Toyota Motor Engineering & Manufacturing North America, Inc., Plano, TX (US)

(72) Inventors: William L. Cyrus, Milton, WV (US); Jonathan L. Smith, Fraziers Bottom, WV (US); Lonnie G. Simpkins, Hurricane, WV (US); Scott A. Tittle, Hurricane, WV (US); Danny L. Richardson, Jr., Letart, WV (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 357 days.

(21) Appl. No.: 16/261,961

(22) Filed: Jan. 30, 2019

(65) Prior Publication Data
US 2020/0240886 A1    Jul. 30, 2020

(51) Int. Cl.
| G01N 3/04 | (2006.01) |
| G01N 3/58 | (2006.01) |
| G01M 15/04 | (2006.01) |
| G01N 3/56 | (2006.01) |

(52) U.S. Cl.
CPC ............ *G01N 3/04* (2013.01); *G01N 3/58* (2013.01); *G01M 15/04* (2013.01); *G01N 3/56* (2013.01)

(58) Field of Classification Search
CPC .. G01N 3/56; G01N 3/58; G01N 3/04; G01M 15/04
See application file for complete search history.

(56) References Cited

U.S. PATENT DOCUMENTS 6,775,917 B1 *   8/2004   Campbell ............... B27B 25/10
                                                        33/415
2017/0314502 A1   11/2017   Suzuki et al.

FOREIGN PATENT DOCUMENTS

| CN | 107891172 A | 4/2018 |
| CN | 207675570 U | 7/2018 |
| JP | H07120372 A | 5/1995 |
| JP | 6378080 B2 | 8/2018 |
| KR | 101272509 B1 | 6/2013 |

* cited by examiner

*Primary Examiner* — Jonathan M Dunlap
(74) *Attorney, Agent, or Firm* — Dinsmore & Shohl LLP

(57) ABSTRACT

The mounting jig assembly includes a jig body and a clamp assembly. The jig body includes a top surface, a bottom surface, a front wall, a rear wall, and a pair of side walls. The jig body is configured to support the test component on the testing assembly with the test component in contact with the top surface and the bottom surface in contact with the testing platform. The jig body defines an elongated opening that extends between the top surface and the bottom surface. The top surface being oriented obliquely with respect to the bottom surface. The clamp assembly is moveable between a clamped position and an unclamped position. In the clamped position the clamp assembly inhibits movement of the test component with respect to the jig body. In the unclamped position the clamp assembly permits movement of the test component with respect to the jig body.

15 Claims, 4 Drawing Sheets

MOUNTING JIG ASSEMBLIES FOR SUPPORTING TEST COMPONENTS ON TESTING PLATFORMS OF TESTING ASSEMBLIES

TECHNICAL FIELD

The present specification generally relates to mounting jig assemblies and, more specifically, to mounting jig assemblies for supporting test components on testing platforms of testing assemblies.

BACKGROUND

It is known to test components on a testing assembly to ensure quality of manufacture. During the testing, the test components are often required to be positioned at a specific orientation with respect to a testing implement of the testing assembly. However, the test component is often cumbersome and the specific orientation places the test component at an angle that is difficult to maintain. As such, it has been known to utilize a jig that is placed on the testing platform of the testing assembly to assist in the positioning of the test component at the specific orientation.

In use, the test component is merely placed on the jig, and, as such, the test component is required to be held in place by a user during the testing operations. Moreover, the previously known jigs are heavy and require multiple users to move.

Accordingly, there is a need for a mounting jig assembly for supporting a test component on a testing platform of a test assembly that includes a jig body that has a reduced weight and is configured to retain the test component to the jig body to inhibit movement of the test component to the jig body.

SUMMARY

In one embodiment, a mounting jig assembly, for supporting a test component on a testing assembly having a testing platform, includes a jig body and a clamp assembly. The jig body includes a top surface, a bottom surface, a front wall, an opposite rear wall, and a pair of side walls that extend between the front wall and the rear wall. The jig body is configured to support the test component on the testing assembly with the test component in contact with the top surface and the bottom surface in contact with the testing platform. The jig body defines an elongated opening that extends between the top surface and the bottom surface. The top surface being oriented obliquely with respect to the bottom surface. The clamp assembly is moveable between a clamped position and an unclamped position. In the clamped position the clamp assembly inhibits movement of the test component with respect to the jig body. In the unclamped position the clamp assembly permits movement of the test component with respect to the jig body.

In another embodiment, a testing assembly includes a testing platform, a test component, and a mounting jig assembly. The mounting jig assembly is configured to support the test component on the testing platform. The mounting jig assembly includes a jig body and a clamp assembly. The jig body includes a top surface configured to contact the test component, a bottom surface configured to contact the testing platform, a front wall, an opposite rear wall, and a pair of side walls that extend between the front wall and the rear wall. The jig body defines an elongated opening that extends between the top surface and the bottom surface. The top surface is oriented obliquely with respect to the bottom surface. The clamp assembly is moveable between a clamped position and an unclamped position. In the clamped position the clamp assembly inhibits movement of the test component with respect to the jig body. In the unclamped position the clamp assembly permits movement of the test component with respect to the jig body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

It may be necessary to support a test component on a testing platform of a testing assembly for various reasons, for example, to cut the test component for testing or to prepare the test component for testing. Moreover, it may be necessary to secure the test component at a particular orientation with respect to a cutting implement of the testing assembly to cut the test component at a particular angle and to inhibit relative motion of the test component with respect to the cutting implement. However, as the testing platform of the testing assembly is generally planar, it may be difficult to orient the test component with respect to the cutting implement. Accordingly, mounting jig assemblies for supporting a test component on a testing platform of a testing assembly and inhibiting movement of the test component may be required.

Testing assemblies according to the present specification include mounting jig assemblies for supporting a test component on a testing assembly having a testing platform. The mounting jig assembly includes a jig body and a clamp assembly. The jig body includes a top surface, a bottom surface, a front wall, an opposite rear wall, and a pair of side walls that extend between the front wall and the rear wall. The jig body is configured to support the test component on the testing assembly with the test component in contact with the top surface and the bottom surface in contact with the testing platform. The jig body defines an elongated opening that extends between the top surface and the bottom surface. The top surface being oriented obliquely with respect to the bottom surface. The clamp assembly is moveable between a clamped position and an unclamped position. In the clamped position the clamp assembly inhibits movement of the test component with respect to the jig body. In the unclamped position the clamp assembly permits movement of the test component with respect to the jig body. As such, the mounting jig assemblies of the present specification provide for a reduction in weight due to the formation of the elongated opening and inhibits movement of the test component with respect to the jig body due to the clamp assembly in the clamped position.

Figure 3A:
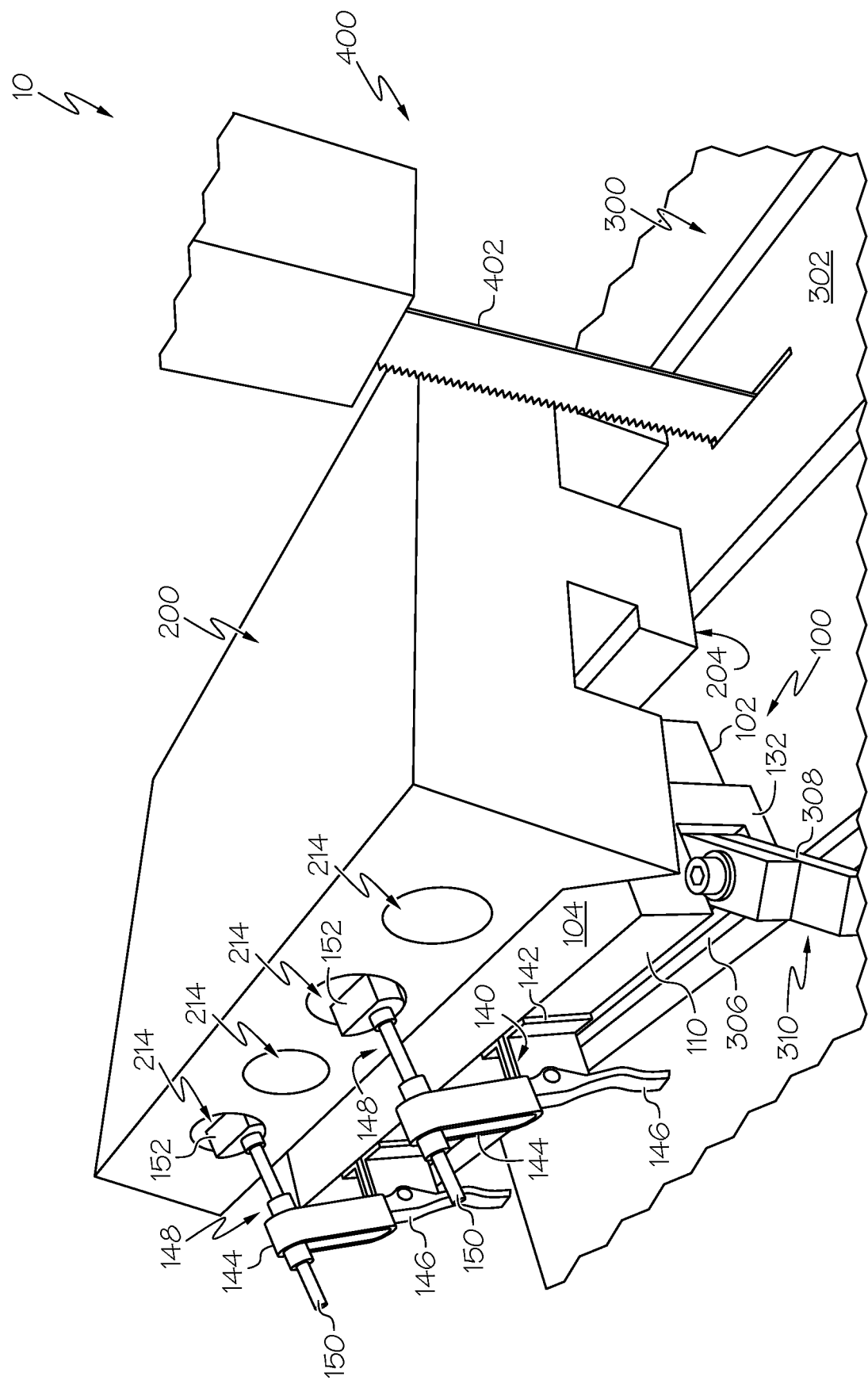
FIG. 3A schematically depicts a testing assembly having a test component supported on the mounting jig assembly with the clamp assembly in the clamped position, according to one or more embodiments shown and described herein.

Referring generally to FIG. 3A, a testing assembly is illustrated at 10. The testing assembly 10 includes a mounting jig assembly 100, a test component 200, a testing platform 300, and a testing impellent 400.

Figure 1:
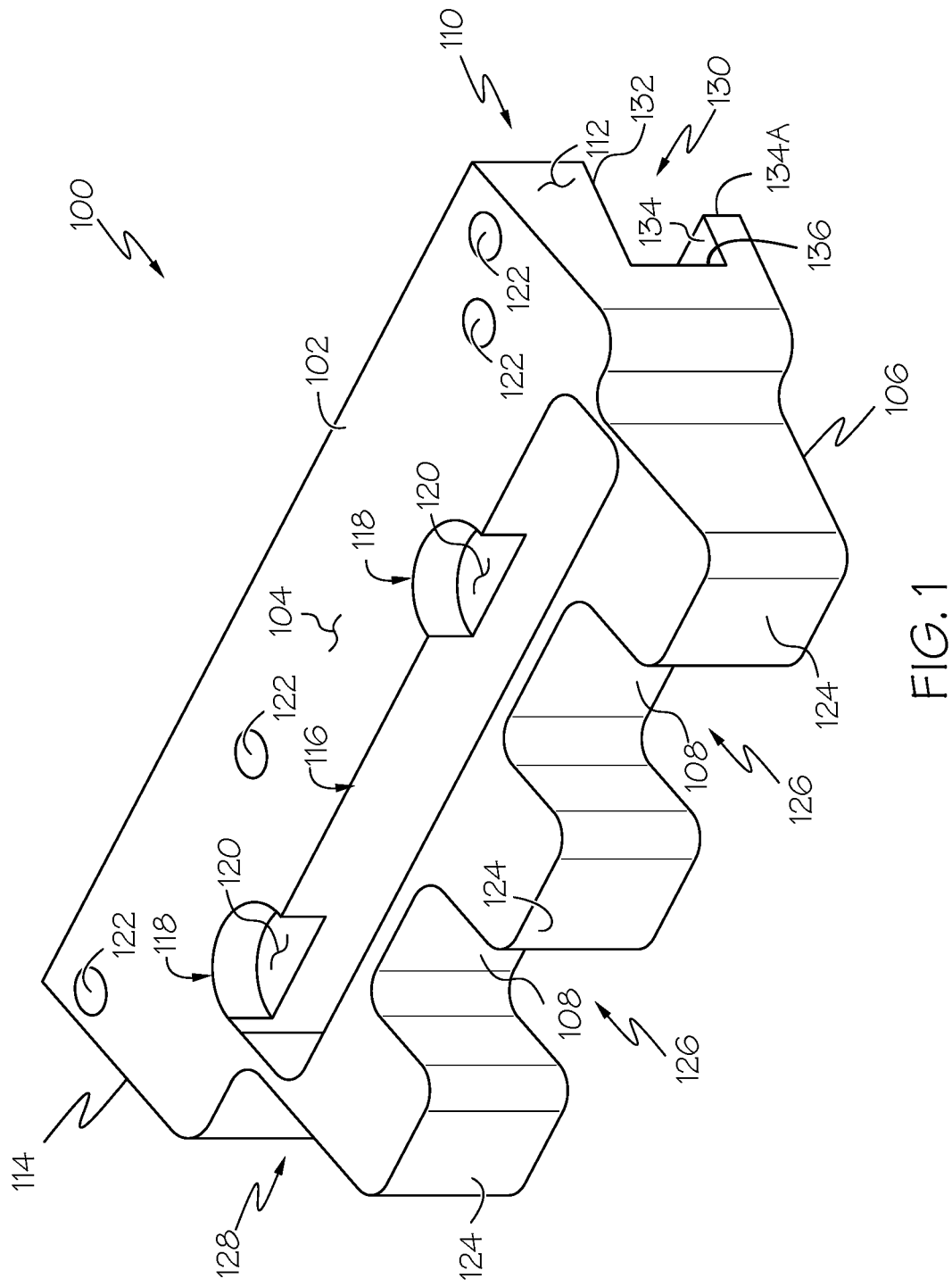
FIG. 1 schematically depicts a jig body of a mounting jig assembly for supporting a test component on a testing platform, according to one or more embodiments shown and described herein.
Figure 2:
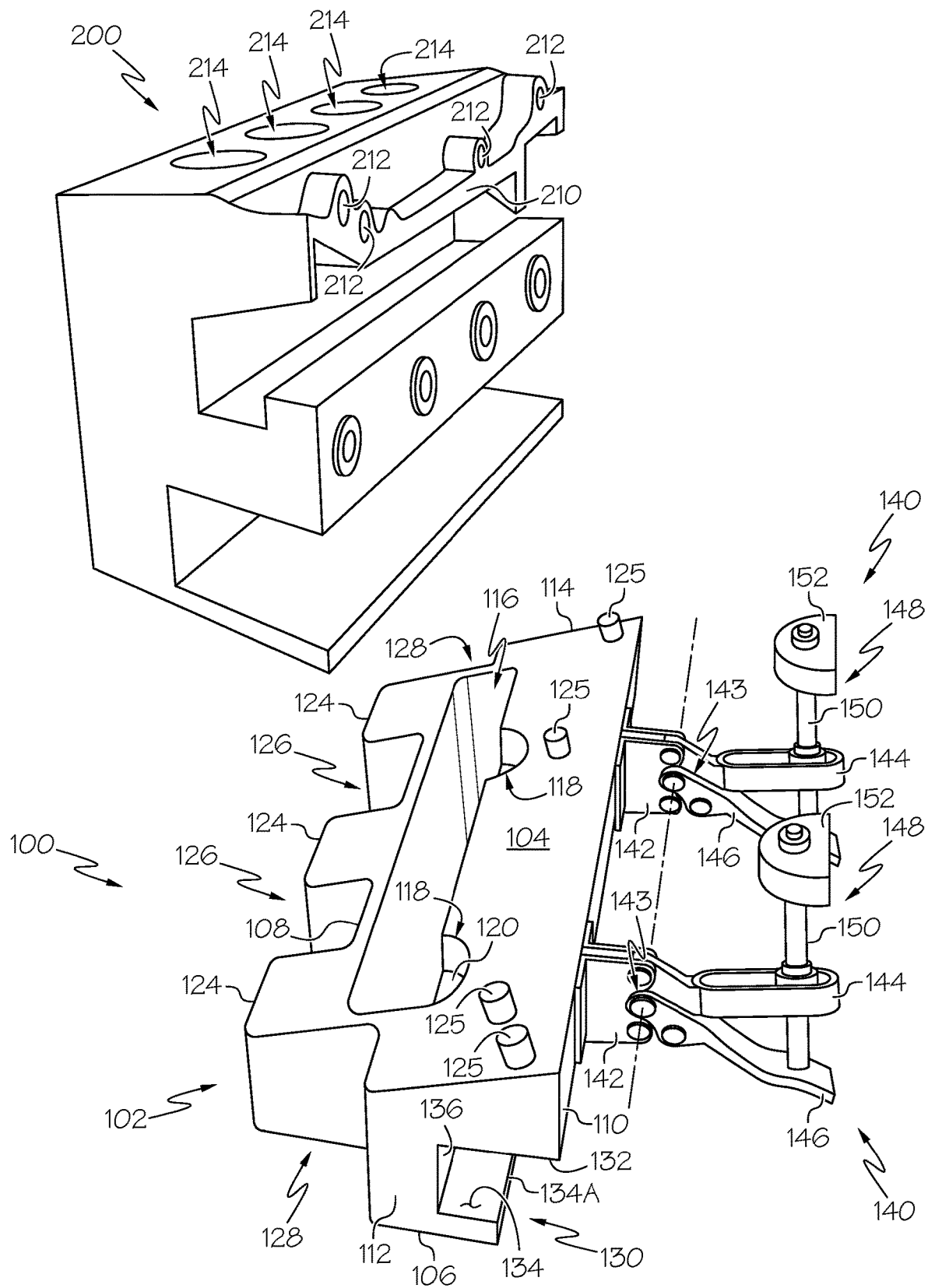
FIG. 2 schematically depicts a mounting jig assembly having a clamp assembly in an unclamped position and a test component, according to one or more embodiments shown and described herein.

Referring now specifically to FIGS. 1, 2, and 3A, one embodiment of a mounting jig assembly 100 for supporting the test component 200 on the testing platform 300 is shown. The mounting jig assembly 100 includes a jig body 102 with a top surface 104, a bottom surface 106, a front wall 108, a rear wall 110, and a pair of side walls 112 and 114. The rear wall 110 is positioned opposite the front wall 108. The top surface 104 is generally planar and is oriented obliquely with respect to the bottom surface 106. Specifically, the top surface 104 extends at an oblique angle with respect to the bottom surface 106. For example, the top surface 104 extends at an angle in the range of 15° to 35° from the bottom surface 106. In some embodiments, the top surface 104 extends at an angle of 2°±1°, 5, or 10°.

In some embodiments, the jig body 102 may be formed metallic materials or metallic alloys, for example steel. In order to reduce the weight of the jig body 102, the jig body 102 may be formed with an elongated opening 116 that extends entirely through the jig body 102 from the top surface 104 to the bottom surface 106. The elongated opening 116 extends in a longitudinal direction of the jig body 102 in the direction between the pair of side walls 112 and 114. In some other embodiments, the elongated opening 116 extends only partially through the jig body 102 from one of the top surface 104 or the bottom surface 106 to reduce weight of the jig body 102.

In some embodiments, the jig body 102 may include additional weight reduction features, for example shaped cutouts 118. As shown in FIG. 1, the shaped cutouts 118 extend downwardly from the top surface 104 to end walls 120. The shaped cutouts 118 may also extend partially into the elongated opening 116 such that the elongated opening 116 and the shaped cutouts 118 are in communication.

The jig body 102 may also include one or more datum pin apertures 122 that extend downwardly from the top surface 104. As will be described in greater detail below, the datum pin apertures 122 are configured to receive datum pins that engage with the datum pin holes 212 of the test component 200 to align the test component 200 with the jig body 102.

Referring to FIG. 2, the jig body 102 may include datum pins 125 that may be received within the datum pin apertures 122 and that may extend upward from the top surface 104. The datum pins 125 may be configured to be received within corresponding datum pin holes 212 formed in a contact surface 210 of the test component 200. For example, the contact surface 210 of the test component 200 contacts the top surface 104 of the jig body 102 and the datum pins 125 are received within datum pin holes 212 to inhibit motion of the test component 200 with respect to the jig body 102 while the test component 200 is cut by the cutting implement 402 (FIG. 3A). In some embodiments, the datum pins 125 are formed as a one piece monolithic structure with the jig body 102. In other embodiments, the datum pins 125 are placed in the datum pin apertures 122, as shown in FIG. 1, and may be secured thereto, for example by welding.

Referring to FIGS. 1 and 2, the jig body 102 may also include a plurality of teeth 124. Each of the plurality of teeth 124 form a portion of the top surface 104 and the bottom surface 106. In some embodiments, the plurality of teeth 124 define gaps 126 there between that are configured to receive a portion of the test component 200. In some other embodiments, the gaps 126 are a weight reduction feature that reduce the weight of the jig body 102.

The front wall 108 may also include cutouts 128 provided between the side walls 112 and 114 and an outer side of teeth 124 positioned adjacent the side walls 112 and 114. The gaps 126 and the cutouts 128 may provide space for alignment of the test component 200 and/or reduce the weight of the jig body 102. In some embodiments, the gaps 126 and cutouts 128 extend an entire height of the jig body 102. In other embodiments, the gaps 126 and cutouts 128 extend only part of the height of the jig body 102. In some embodiments, the depth of the gaps 126 and the cutouts 128 is the same, although this is not necessary. As shown in FIG. 1, the depth of the gaps 126 into the jig body 102 is less than the depth of the cutouts 128 into the jig body 102.

Still referring to FIGS. 1 and 2, the jig body 102 includes an elongated mounting slot 130 that extends along the rear wall 110 between the pair of side walls 112 and 114. The elongated mounting slot 130 is defined by a portion of the rear wall 110 being removed to form a lower slot wall 134, an upper slot wall 132, and an interior wall 136. The upper slot wall 132 extends inwardly from the rear wall 110 to the interior wall 136. The lower slot wall 134 extends outwardly from the interior wall 136. In some embodiments, the upper slot wall 132 has a length that is equal to a length of the lower slot wall 134, and in some other embodiments, the lower slot wall 134 has a length that is less than a length of the upper slot wall 132. In the illustrated embodiment, the lower slot wall 134 includes a rear face 134A that is positioned inwardly with respect to the rear wall 110.

Referring to FIGS. 2 and 3, the mounting jig assembly 100 also includes a clamp assembly 140 that includes one or more clamps that are movable between an unclamped position, as shown in FIG. 2, and a clamped position, as shown in FIG. 3A. The clamp assembly 140 includes a bracket 142, a clamp arm 144, and a handle 146. The clamp arm 144 and the handle 146 may pivot about a pivot point 143 to pivot from the unclamped position to the clamped position and vice-a-versa. The bracket 142 is mounted to the rear wall 110 of the jig body 102. The handle 146 is coupled to the bracket 142 and the clamp arm 144 and configured to lock the clamp assembly 140 in the clamped position.

The clamp arm 144 includes a connection portion 148 that engages with the test component 200. Specifically, the connection portion 148 includes an externally threaded shaft 150 and a shaped insert 152 at a distal end of the externally threaded shaft 150. The externally threaded shaft 150 engages within an internally threaded bore formed on the clamp arm 144 to allow for movement of the shaped insert 152 with respect to the clamp arm 144, for example, along a longitudinal axis of the clamp arm 144.

Referring to FIG. 2, test component 200 includes at least one shaped aperture 214. The shaped insert 152 of the connection portion 148 corresponds in shape to the shaped aperture 214. In order to provide increased contact between the shaped apertures 214 of the test component and the shaped insert 152, the shaped insert 152 is formed having a corresponding shape to the shaped apertures 214, for example, the shaped apertures 214 are generally circular and the shaped inserts 152 are formed as generally semicircular. In the illustrated embodiment, the test component 200 is a cylinder head of an internal combustion engine, and the shaped apertures 214 are cylinders of the cylinder head. For example, the shaped apertures 214 have a generally circular shape and the shaped inserts 152 are formed having a generally semicircular shape. As such, the shaped insert 152 engages with an interior surface of the shaped aperture 214 when the clamp assembly 140 is in the clamped position. In some embodiments, the shaped insert 152 may be made from a relatively soft material as compared to the interior surface of the shaped apertures 214 such that the shaped insert 152 does not scratch or otherwise mar the interior surface of the shaped apertures 214 when it is installed in the test component 200.

As the connection portion 148 is attached to the clamp arm 144 that is pivotally connected to the bracket 142, the connection portion 148 is moveable between a disengaged position and an engaged position. In the disengaged position, the shaped insert 152 is disengaged and/or spaced apart from the shaped aperture 214 of the test component 200. In the engaged position, the shaped insert 152 engages with the shaped aperture 214 of the test component, specifically, in the engaged position, the shaped insert 152 contacts the shaped aperture 214.

The handle 146 is moveable between a locked position and an unlocked position. In the locked position, the handle 146 inhibits movement of the clamp arm 144 with respect to the bracket 142. In the unlocked position, the handle 146 permits movement of the clamp arm 144 with respect to the bracket 142.

Referring to FIG. 2, the clamp assembly 140 is in the unclamped position with the shaped insert 152 in the disengaged position and the handle in the unlocked position. As the shaped insert 152 is in the disengaged position when the clamp assembly 140 is in the unclamped position, the test component 200 is permitted to move with respect to the jig body 102. Specifically, as the shaped insert 152 is disengaged from the shaped aperture 214, the clamp assembly 140 permits movement of the test component 200 with respect to the jig body 102.

Referring to FIG. 3A, the clamp assembly 140 is in the clamped position with the shaped insert 152 in the engaged position and the handle in the locked position. As the shaped insert 152 is in the engaged position when the clamp assembly 140 is in the clamped position, the test component 200 is inhibited to move with respect to the jig body 102. Specifically, as the shaped insert 152 is engaged with the shaped aperture 214, the clamp assembly 140 inhibits movement of the test component 200 with respect to the jig body 102.

Figure 3B:
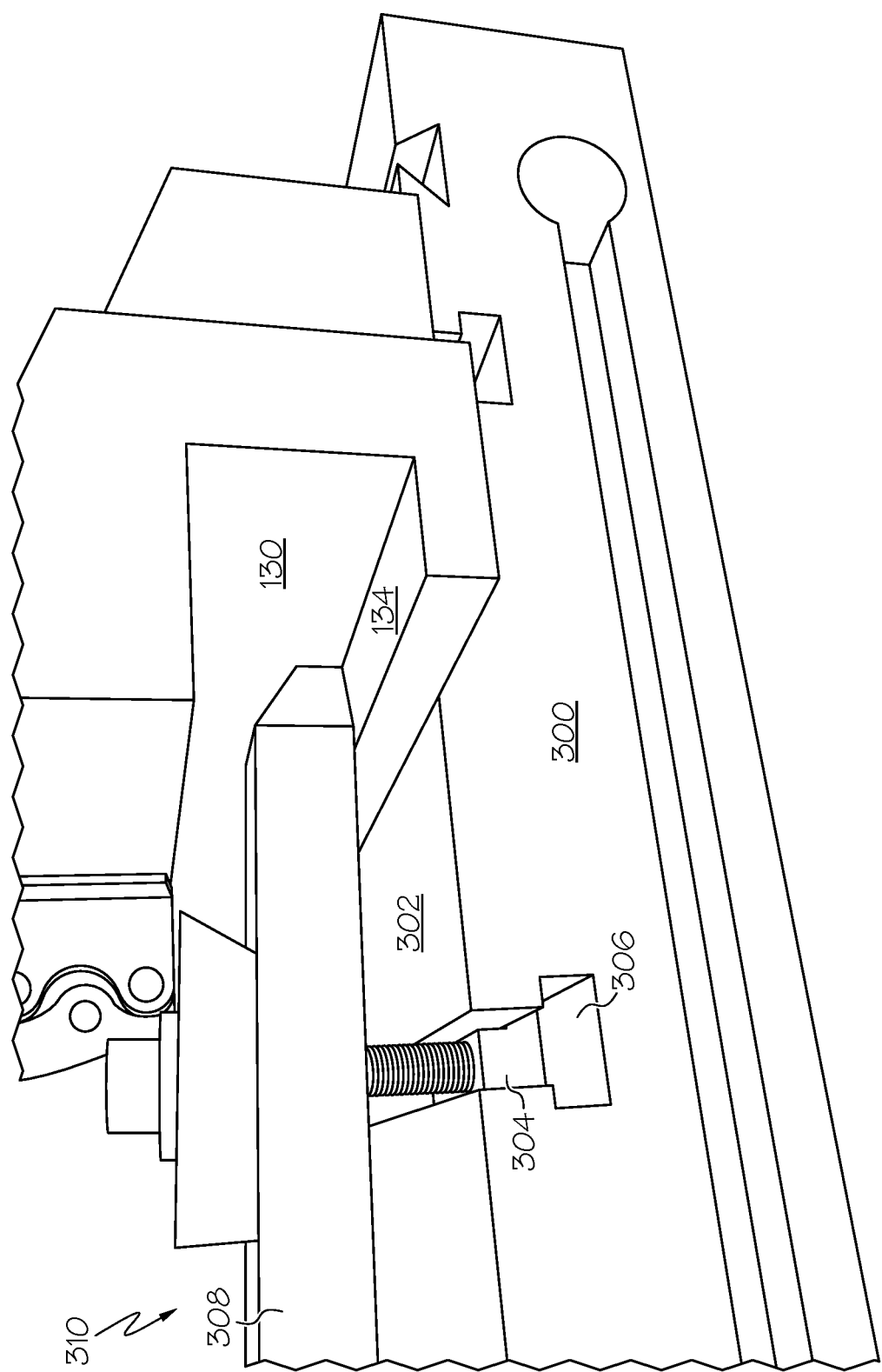
FIG. 3B schematically depicts a partial enlarged view of the mounting jig assembly secured to the testing platform by a locking assembly, according to one or more embodiments shown and described herein.

Referring to FIGS. 3A and 3B, the testing impellent 400 may include an cutting implement 402 and the testing platform 300 may include a testing table 302 and a locking assembly 310. One or more of the cutting implement 402 and the testing table 302 may be formed from metal or other substantially hard and rigid material. In some embodiments, the cutting implement 402 is a bandsaw. In some embodiments, the testing platform 300 includes the locking assembly 310 which may include a locking channel 306 and one or more locking arms 308. The one or more locking arms 308 may be removably coupled to the testing table 302 through a connection with a locking pin 304 that may be coupled to the locking arm 308 with a threaded fastener that may extend from the locking channel 306 and may be configured to move to selectively couple the mounting jig assembly 100 to the testing table 302 to prevent relative motion between the mounting jig assembly 100 and the testing table 302. In some embodiments, the locking arm 308 may extend into the elongated mounting slot 130 over the lower slot wall 134 of the elongated mounting slot 130. One exemplary method for locking the mounting jig assembly 100 to the testing table 302 includes positioning the locking arm 308 into the elongated mounting slot 130, causing the locking arm 308 to tighten onto the lower slot wall 134 by tightening the coupling between the locking arm and the locking pin 304. This may increase the friction between the locking arm 308 and the mounting jig assembly 100 and inhibit relative motion between the testing table 302 and the mounting jig assembly 100. Thus, the friction between the locking arm 308 and the walls of the locking channel 306 may prevent the locking arm 308 from moving with respect to the testing table 302. A user may position one or more locking arms 308 or other components in the elongated mounting slot 130 (e.g., a clamp, etc.) to hold the mounting jig assembly 100 in place.

Once the position of the mounting jig assembly 100 is fixed with respect to the testing table 302, the user may place the test component 200 on top of the mounting jig assembly 100, such that the test component 200 may be in position to be cut by the cutting implement 402. The user may align the datum pin holes 202 of the test component 200 with the datum pins 125 of the mounting jig assembly 100. The contact surface 210 of the test component 200 may rest on the top surface 104 of the mounting jig assembly 100.

With the test component 200 on the mounting jig assembly 100, the user may engage the clamping assembly 138 to further inhibit relative motion between the test component 200 and the mounting jig assembly 100. The user may cause the clamp arm 144 to pivot about the bracket 142, which may cause the clamp arm 144 and shaped insert 152 to rotate about the pivot point 143. The shaped insert 152 may contact the test component 200, for example, at least one of the shaped apertures 214. In some embodiments, the orientation of the clamp arm 144 may be lockable.

Referring now to FIGS. 1, 2, 3A, and 3B, operation of the mounting jig assembly 100 is described. A user may lift the mounting jig assembly 100 and place it on top of the testing table 302. Because the mounting jig assembly 100 includes various cutout portions (e.g., the elongated opening 116, the elongated mounting slot 130, the gaps 126, the cutouts 128, etc.) the weight of the mounting jig assembly 100 may be less than 20 pounds. In some embodiments, the weight of the mounting jig assembly 100 may be less than 17 pounds. In some embodiments, the device may be made from a metal or a metal alloy, such as steel, copper, aluminum, nickel, tin, or the like or combinations thereof. Once the user places the mounting jig assembly 100 on the testing table 302, the user may lock the mounting jig assembly 100 to the testing table 302 as described herein.

It should now be understood that a testing assembly according to the present specification includes a mounting jig assembly for supporting a test component on a testing assembly having a testing platform. The mounting jig assembly includes a jig body and a clamp assembly. The jig body includes a top surface, a bottom surface, a front wall, an opposite rear wall, and a pair of side walls that extend between the front wall and the rear wall. The jig body is configured to support the test component on the testing assembly with the test component in contact with the top surface and the bottom surface in contact with the testing platform. The jig body defines an elongated opening that extends between the top surface and the bottom surface. The top surface being oriented obliquely with respect to the bottom surface. The clamp assembly is moveable between a clamped position and an unclamped position. In the clamped position the clamp assembly inhibits movement of the test component with respect to the jig body. In the unclamped position the clamp assembly permits movement of the test component with respect to the jig body. As such, the mounting jig assemblies of the present specification provides for a reduction in weight due to the formation of the elongated opening and inhibits movement of the test component with respect to the jig body due to the clamp assembly in the clamped position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mounting jig assembly for supporting a test component on a testing assembly having a testing platform, the mounting jig assembly comprising:
   a jig body that includes a top surface, a bottom surface, a front wall, a rear wall opposite the front wall, and a pair of side walls that extend between the front wall and the rear wall, the jig body configured to support the test component on the testing assembly with the test component in contact with the top surface and the bottom surface in contact with the testing platform, the jig body defines an elongated opening that extends between the top surface and the bottom surface, the top surface being oriented obliquely with respect to the bottom surface; and
   a clamp assembly that is moveable between a clamped position and an unclamped position, in the clamped position the clamp assembly inhibits movement of the test component with respect to the jig body, and in the unclamped position the clamp assembly permits movement of the test component with respect to the jig body.

2. The mounting jig assembly of claim 1, wherein a plurality of teeth extend outwardly from the front wall, the plurality of teeth forming a portion of the top surface and the bottom surface.

3. The mounting jig assembly of claim 2, wherein the test component includes at least one shaped aperture,
   wherein the clamp assembly includes a clamp arm having a connection portion that has a shape corresponding to the shaped aperture of the test component,
   wherein in the clamped position the connection portion engages with the shaped aperture to inhibit movement of the test component with respect to the jig body, and in the unclamped position the connection portion is disengaged with the shaped aperture to permit movement of the test component with respect to the jig body.

4. The mounting jig assembly of claim 3, wherein the clamp assembly includes a bracket mounted to the rear wall of the jig body, the clamp arm being pivotally connected to the bracket for movement between an engaged position and a disengaged position upon movement of the clamp assembly between the clamped position and the unclamped position, in the engaged position the connection portion engages with the shaped aperture of the test component and in the disengaged position the connection portion is disengaged with the shaped aperture of the test component.

5. The mounting jig assembly of claim 4, wherein the rear wall includes an elongated mounting slot that extends between a lower slot wall, an upper slot wall, and an interior wall.

6. The mounting jig assembly of claim 5, wherein a locking arm contacts the upper slot wall to retain the jig body with respect to the testing platform so as to prevent movement of the jig body with respect to the testing platform.

7. A testing assembly comprising
   a testing platform;
   a test component; and
   a mounting jig assembly configured to support the test component on the testing platform, the mounting jig assembly comprising:
   a jig body that includes a top surface configured to contact the test component, a bottom surface configured to contact the testing platform, a front wall, a rear wall opposite the front wall, and a pair of side walls that extend between the front wall and the rear wall, the jig body defines an elongated opening that extends between the top surface and the bottom surface, the top surface being oriented obliquely with respect to the bottom surface; and
   a clamp assembly that is moveable between a clamped position and an unclamped position, in the clamped position the clamp assembly inhibits movement of the test component with respect to the jig body, and in the unclamped position the clamp assembly permits movement of the test component with respect to the jig body.

8. The testing assembly of claim 7, wherein a plurality of teeth extend outwardly from the front wall, the plurality of teeth forming a portion of the top surface and the bottom surface.

9. The testing assembly of claim 8, wherein the test component includes at least one shaped aperture,
   wherein the clamp assembly includes a clamp arm having a connection portion that has a shape corresponding to the shaped aperture of the test component,
   wherein in the clamped position the connection portion engages with the shaped aperture to inhibit movement of the test component with respect to the jig body, and in the unclamped position the connection portion is disengaged with the shaped aperture to permit movement of the test component with respect to the jig body.

10. The testing assembly of claim 9, wherein the clamp assembly includes a bracket mounted to the rear wall of the jig body, the clamp arm being pivotally connected to the bracket for movement between an engaged position and a disengaged position upon movement of the clamp assembly between the clamped position and the unclamped position, in the engaged position the connection portion engages with the shaped aperture of the test component and in the disengaged position the connection portion is disengaged with the shaped aperture of the test component.

11. The testing assembly of claim 10, wherein the rear wall includes an elongated mounting slot that extends between a lower slot wall, an upper slot wall, and an interior wall.

12. The testing assembly of claim 11 further comprising a locking assembly that includes a locking arm and a locking pin extending outwardly from the locking arm, the locking pin configured to engaging within a locking channel formed in the testing platform and the locking arm engages within an elongated mounting slot to contact the lower slot wall to inhibit the jig body from moving with respect to the testing platform.

13. The testing assembly of claim 12 further comprising a cutting implement configured to cut the test component.

14. The testing assembly of claim 13, wherein the test component is a cylinder head of an internal combustion engine.

15. The testing assembly of claim 14, wherein the cutting implement is a bandsaw.

* * * * *